United States Patent
Ohkado

(10) Patent No.: US 10,776,475 B2
(45) Date of Patent: Sep. 15, 2020

(54) SECURE PASSWORD INPUT IN ELECTRONIC DEVICES

(71) Applicant: INTERNATIONAL BUSINESS MACHINES CORPORATION, Armonk, NY (US)

(72) Inventor: Akira Ohkado, Yokohama (JP)

(73) Assignee: International Business Machines Corporation, Armonk, NY (US)

(*) Notice: Subject to any disclaimer, the term of this patent is extended or adjusted under 35 U.S.C. 154(b) by 407 days.

(21) Appl. No.: 15/810,937

(22) Filed: Nov. 13, 2017

(65) Prior Publication Data

US 2019/0147158 A1 May 16, 2019

(51) Int. Cl.
| | |
|---|---|
| *H04L 29/06* | (2006.01) |
| *G06F 21/36* | (2013.01) |
| *G02B 27/01* | (2006.01) |
| *G06F 21/83* | (2013.01) |

(52) U.S. Cl.
CPC .......... *G06F 21/36* (2013.01); *G02B 27/017* (2013.01); *G06F 21/83* (2013.01); *H04L 63/083* (2013.01); *G06F 2221/031* (2013.01)

(58) Field of Classification Search
CPC .......... G06F 21/00; G06F 21/30; G06F 21/31; G06F 21/34; G06F 21/36; G06F 21/82; G06F 21/83; H04L 63/08; H04L 63/083; H04L 63/0853; G02B 27/017
See application file for complete search history.

(56) References Cited

U.S. PATENT DOCUMENTS

| | | | | |
|---|---|---|---|---|
| 9,824,206 B1* | 11/2017 | Liu | .......................... | G06F 21/32 |
| 10,248,192 B2* | 4/2019 | Lehman | .................. | G06F 3/013 |
| 2004/0117011 A1* | 6/2004 | Aharoni | ................ | A61F 2/1651 |
| | | | | 623/6.11 |
| 2011/0162066 A1* | 6/2011 | Kim | ........................ | G06F 3/017 |
| | | | | 726/18 |

(Continued)

FOREIGN PATENT DOCUMENTS

| | | |
|---|---|---|
| EP | 3136275 A1 | 3/2017 |
| KR | 1020160037008 A | 4/2016 |

OTHER PUBLICATIONS

Fink, "The Cybercrime Economy: Google Glass Wearers Can Steal Your Password", CNN tech, Jul. 9, 2014, pp. 1-4, http://money.cnn.com/2014/07/07/technology/security/google-glass-password-hack/index.html.

(Continued)

*Primary Examiner* — Eric W Shepperd
(74) *Attorney, Agent, or Firm* — Robert C. Bunker

(57) ABSTRACT

A method, computer system, and computer program product. Input element layout data based on a layout of input elements of an input device is retrieved in response to a received password input request. A positioning marker and a visualized overlay input device including an altered layout of input elements is generated based on the retrieved input element layout data. The visualized overlay input device and the positioning marker are rendered for display by a see-through display device for viewing of the visualized overlay input device in superposition with respect to the input device. An effective input configuration of the layout of input elements of the input device is generated to correspond to the altered layout of input elements for entry of the password input.

12 Claims, 6 Drawing Sheets

(56) References Cited

U.S. PATENT DOCUMENTS

| | | | |
|---|---|---|---|
| 2013/0215374 A1* | 8/2013 | Blum | G02O 7/081 351/158 |
| 2014/0055343 A1 | 2/2014 | Kim | |
| 2014/0125574 A1* | 5/2014 | Scavezze | G06F 21/36 345/156 |
| 2014/0139439 A1* | 5/2014 | Park | G06F 3/04886 345/169 |
| 2014/0310531 A1 | 10/2014 | Kundu et al. | |
| 2014/0351896 A1* | 11/2014 | Koo | G06F 21/10 726/4 |
| 2015/0182330 A1* | 7/2015 | Grant | A61B 5/1112 623/6.37 |
| 2015/0288933 A1* | 10/2015 | Iversen | G06F 3/147 348/14.07 |
| 2015/0332038 A1 | 11/2015 | Ramsden | |
| 2016/0113760 A1 | 4/2016 | Conrad | |
| 2016/0255166 A1 | 9/2016 | Piccinini et al. | |
| 2017/0076502 A1 | 3/2017 | Chen et al. | |
| 2017/0157507 A1* | 6/2017 | Aoki | G06K 9/00671 |
| 2017/0186236 A1* | 6/2017 | Kawamoto | G06F 21/36 |
| 2017/0206673 A1* | 7/2017 | Kawamoto | G06T 7/70 |
| 2017/0284771 A1* | 10/2017 | Roman | F41G 1/38 |
| 2017/0324726 A1* | 11/2017 | Alleaume | G06F 3/167 |
| 2018/0365405 A1* | 12/2018 | Mistry | G06F 21/36 |

OTHER PUBLICATIONS

Swearingen, "How the Camera Doomed Google Glass", Jan. 15, 2015, pp. 1-3, https://www.theatlantic.com/technology/archive/2015/01/how-the-camera-doomed-google-glass/384570/, The Atlantic.

King, Jr., "Samsung 'Galaxy Glass' Patent Filing Shows Augmented Reality Keyboard That Gets Projected Onto Your Fingers", Mar. 5, 2014, pp. 1-5, http://www.androidpolice.com/2014/03/05/samsung-galaxy-glass-patent-filing-shows-augmented-reality-keyboard-that-gets-projected-onto-your-fingers/.

Costill, "Top 10 Places that Have Banned Google Glass", Search Engine Journal, Aug. 7, 2013, pp. 1-12, https://www.searchenginejournal.com/top-10-places-that-have-banned-google-glass/66585/.

Wilkey, "Woman Attacked for Wearing Google Glass At San Francisco Dive Bar", Feb. 25, 2014, pp. 1-3, Huffpost, https://www.huffingtonpost.com/2014/02/25/woman-attacked-google-glass_n_4854442.html.

NTT Data Corporation, "Keyboard Less Environment for Utilizing Smart Glasses in Business Character Input is Realized", Oct. 15, 2014, 12 Pages, NTT Data Corporation, http://www.nttdata.com/jp/ja/news/release/2014/101502.html.

Chowdhry, "Samsung Patent Unveils Idea For Smart Contact Lenses With A Camera and Display", Apr. 11, 2016, 3 Pages, Printed on Oct. 5, 2017, Forbes, https://www.forbes.com/sites/amitchowdhry/2016/04/11/samsung-patent-unveils-smart-contact-lenses-with-a-camera-and-display/#baadaca103bd.

Lingley et al., "A Single-Pixel Wireless Contact Lens Display", Journal of Micromechanics and Microengineering, Nov. 22, 2011, 15 Pages, vol. 21, No. 12, IOP Publishing Ltd.

Mell et al., "The NIST Definition of Cloud Computing", NIST, Sep. 2011, 7 Pages, Special Publication 800-145, U.S. Department of Commerce, Gaithersburg, MD.

* cited by examiner

SECURE PASSWORD INPUT IN ELECTRONIC DEVICES

BACKGROUND

The present invention relates generally to computer security, and in particular to secure password input.

SUMMARY

Aspects of the present invention are directed to a method, system, and computer program product.

According to an aspect of the present invention, a method is provided. The method may include retrieving input element layout data based on a layout of input elements of an input device in response to receiving a password input request. A positioning marker and a visualized overlay input device including an altered layout of input elements is generated based on the input element layout data. The visualized overlay input device and the positioning marker for display by a see-through display device are rendered for viewing of the visualized overlay input device in superposition with respect to the input device. An effective input configuration of the layout of input elements of the input device is generated to correspond to the altered layout of input elements for entry of the password input.

According to an aspect of the present invention, a computer system is provided. The computer system may include one or more computer processors, one or more computer-readable storage media, and program instructions stored on one or more of the computer-readable storage media for execution by at least one of the one or more computer processors. The program instructions may be executed to perform the disclosed method.

According to an aspect of the present invention, a computer program product is provided. The computer program product may include one or more computer-readable storage devices and program instructions stored on at least one of the one or more computer-readable storage devices for execution by at least one or more computer processors of a computer system. The program instructions may be executed by the at least one or more computer processors of the computer system to perform the disclosed method.

BRIEF DESCRIPTION OF THE DRAWINGS

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Figure 1:
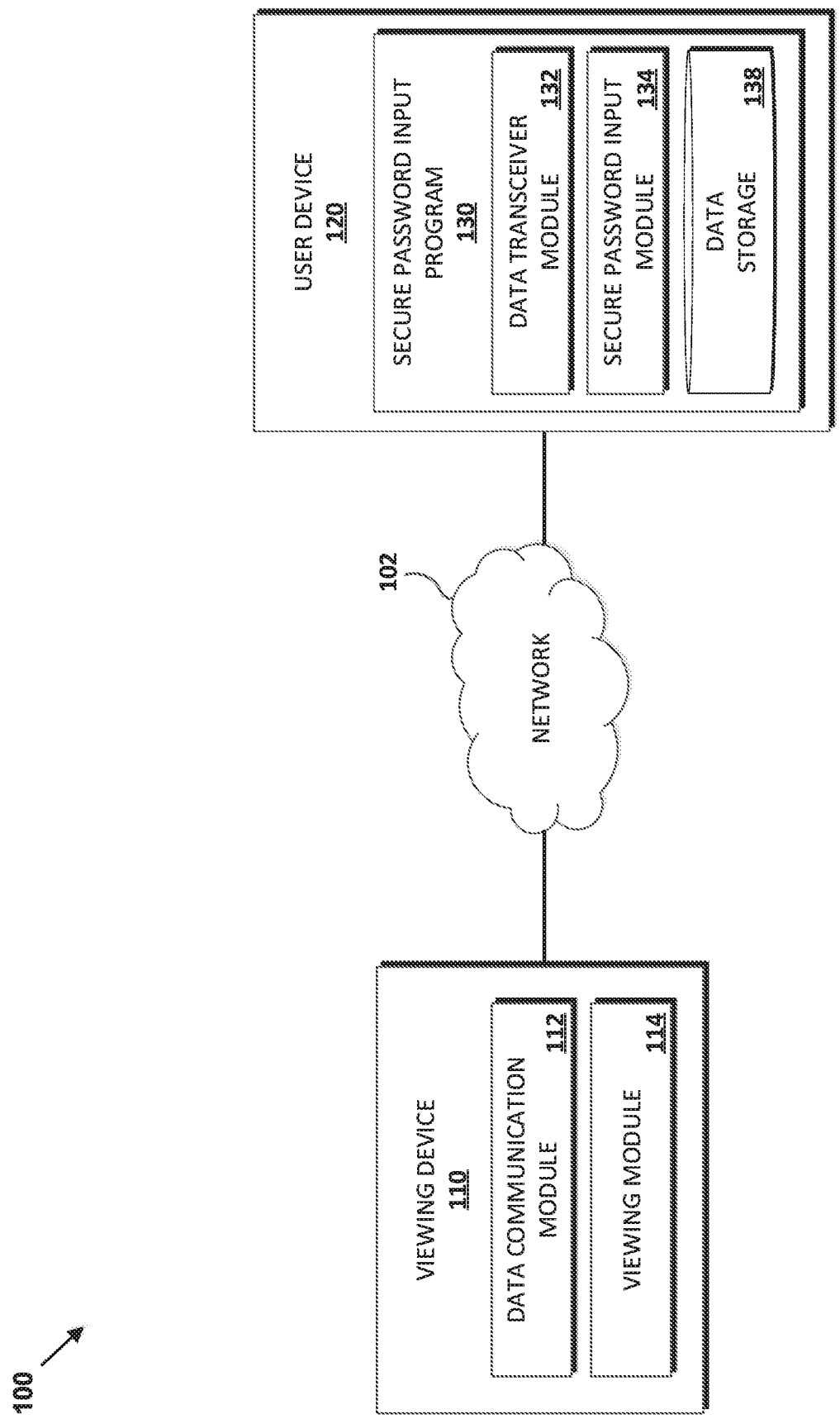
FIG. 1 is a functional block diagram depicting a secure password input system, in accordance with an embodiment of the present invention.

Detailed embodiments of the present invention are disclosed herein for purposes of describing and illustrating claimed structures and methods that may be embodied in various forms, and are not intended to be exhaustive in any way, or limited to the disclosed embodiments. Many modifications and variations will be apparent to those of ordinary skill in the art without departing from the scope and spirit of the disclosed embodiments. The terminology used herein was chosen to best explain the principles of the one or more embodiments, practical applications, or technical improvements over current technologies, or to enable those of ordinary skill in the art to understand the embodiments disclosed herein. As described, details of well-known features and techniques may be omitted to avoid unnecessarily obscuring the embodiments of the present invention.

References in the specification to "one embodiment," "an embodiment," "an example embodiment," or the like, indicate that the embodiment described may include one or more particular features, structures, or characteristics, but it shall be understood that such particular features, structures, or characteristics may or may not be common to each and every disclosed embodiment of the present invention herein. Moreover, such phrases do not necessarily refer to any one particular embodiment per se. As such, when one or more particular features, structures, or characteristics is described in connection with an embodiment, it is submitted that it is within the knowledge of those skilled in the art to affect such one or more features, structures, or characteristics in connection with other embodiments, where applicable, whether or not explicitly described.

A password or access code may be used for authentication purposes to secure and control access to resources such as electronic or computing resources, and the like. For instance, the password may be used to determine whether a person or user is entitled to, or otherwise possesses a right or authority to gain access to a particular resource such as a particular electronic resource. In the field of computer security, an effort may be made to maintain the confidentiality of a particular password by the person with which the particular password is associated, as the particular password may be used by the person to both secure and access personal, private, or confidential electronic or computing resources, and the like.

Many techniques exist for authenticating requests by users to access secured resources. For example, a common technique may include assigning a user unique login credentials and requiring entry or input of the unique login credentials for authentication of a request by a user such as the user to access a secured resource. Login credentials may include a unique username and password. The purpose of using a password, and the utility provided in doing so, is undermined when knowledge of the password is leaked, such as to those having malicious intent. Unfortunately, sometimes occurrences of such leaks cannot be helped, as knowledge of the password may be accidentally leaked by the associated user, due to reasons beyond the user's control. For instance, an unauthorized user to-be of another user's secured resource may obtain the password associated with the other user such as by observing the other user enter or input the password to a device in a public space. Such practices are known as "shoulder surfing" in the field of computer security.

Embodiments of the present invention are directed to a system and method for secure password input. Input element layout data based on a layout of input elements of an input device is retrieved in response to receiving a password input request. A visualized overlay keyboard having an altered layout of input elements is generated based on the input element layout data. The visualized overlay keyboard is rendered for display by a see-through display device, for viewing of the visualized overlay keyboard in superposition with respect to the input device. An effective input layout of the layout of input elements of the input device is determined and generated to correspond to the altered layout of input elements of the visualized overlay keyboard, for entry of the password input to the device, accordingly.

Advantageously, the system and method for secure password input according to the present disclosure provides secured password input that protects against "shoulder surfers," by creating an observable discrepancy in appearance between the layout of the input elements apparently used for password input to the device, and the layout of the input elements actually used for password input to the device. To that end, embodiments of the present invention have the capacity to improve the technical field of computer security by providing a dynamic security measure implementable to protect or otherwise maintain security of secured resources used or accessed in public spaces, and the like.

FIG. 1 is a functional block diagram depicting secure password input system 100, in accordance with an embodiment of the present invention. Secure password input system 100 may include viewing device 110 and user device 120, interconnected by way of network 102. While FIG. 1 depicts two discrete devices in secure password input system 100, other arrangements may be contemplated, for example, viewing device 110 and user device 120 may form one or more integrated devices.

In various embodiments of the present invention, network 102 represents, for example, an intranet, a local area network (LAN), a personal area network (PAN), a wireless local area network (WLAN), a wireless personal area network (WPAN), or a wide area network (WAN) such as the Internet, and may include wired, wireless, or fiber optic connections. In general, network 102 may be any combination of connections and protocols that may support communications between viewing device 110 and user device 120, in accordance with embodiments of the present invention. In the various embodiments, network 102 may be, for example, the Internet, representative of a worldwide collection of networks and gateways that may support communications between devices connected to the Internet.

In various embodiments of the present invention, viewing device 110 and user device 120 each respectively represent individual or integrated computing platforms such as a wearable or implantable computer or device, a smart phone, a tablet computer, a laptop computer, a desktop computer, or a computer server. In the various embodiments, viewing device 110 or user device 120 may otherwise be any other type of computing platform, computing system, or information system capable of sending and receiving data to and from another device by way of network 102. Viewing device 110 or user device 120 may include internal and external hardware components, as described with reference to FIG. 4. In other embodiments, viewing device 110 or user device 120 may include software components that may be implemented in a cloud computing environment, as described with reference to FIGS. 5 and 6.

Viewing device 110 includes data communication module 112 and viewing module 114. In various embodiments of the present invention, viewing device 110 may be a wearable or implantable see-through display device such as an optical head-mounted display, a contact lens display, or an intra-ocular display. In the various embodiments, viewing device 110 may implement a combination of devices and technologies, such as network devices and corresponding device drivers or radio communication devices and corresponding power-harvesting and control circuitry, accordingly, to support the operation of data communication module 112 and viewing module 114, and to provide a platform enabling communications between viewing device 110 and user device 120.

Data communication module 112 hosts data received by way of network 102 from secure password input program 130 residing on user device 120. In an embodiment of the present invention, the received data may include, for example, virtual object data. Data communication module 112 may store the received data in memory, for example, in RAM of an optical head-mounted display, or in EEPROM of control circuitry for a contact lens or intra-ocular display, for later retrieval and use.

Viewing module 114 renders virtual objects or images based on the virtual object data. In an embodiment of the present invention, a virtual object may be rendered in the form of, for example, a digital image or visualization such as a raster graphics or bitmap image. Viewing module 114 may render the virtual objects by implementing, for example, a field sequential color liquid crystal on silicon display in an optical head-mounted display, or a multi-pixel contact lens display in a contact lens display, accordingly.

In various embodiments of the present invention, a virtual object may be, for example, an overlay input device or keyboard. In the various embodiments, the overlay input device or keyboard may be an image or visualization resembling an input device of user device 120, which may include an altered layout or configuration of visualized input elements with respect to a layout or configuration of input elements of the input device of user device 120. For example, where a layout of input elements of the input device includes a "QWERTY" layout of alphanumeric characters, a layout of input elements of the overlay input device or keyboard may include a "non-QWERTY" layout of the alphanumeric characters. In the various embodiments, the altered layout of input elements of the overlay input device or keyboard may be, for example, randomized with respect to the layout of input elements of the input device of user device 120.

In various embodiments of the present invention, a virtual object may be, for example, a substitute input device or keyboard. In the various embodiments, the substitute input device or keyboard may be an image or visualization resembling the input device of user device 120. In the various embodiments, the substitute input device or keyboard may include, for example, a substitute or false layout or configuration of visualized input elements with respect to the layout or configuration of input elements of the input device of user device 120. In the various embodiments, the substitute input device or keyboard may be used to visualize and display the layout of input elements of the input device of user device 120 in terms of the false layout of visualized input elements. For example, the layout of input elements of the input device of user device 120 may be replaced by the false layout of input elements of the substitute input device or keyboard for entry of the password input to user device 120 by way of the input device. In the various embodiments, the false layout of input elements of the substitute input device or keyboard may include, for example, discrepancies with respect to the layout of input elements of the input device of user device 120. For example, the discrepancies may include omitted input elements with respect to the input elements of the input device, input elements of the input device that may be replaced with a random or illegible symbol, respectively, and so on.

In various embodiments of the present invention, a virtual object may be, for example, a positioning marker or boundary. In the various embodiments, the positioning marker may be composed of indicia or marks arranged to form a reticle, a graticule, a crosshair, or the like. In the various embodiments, the positioning marker or boundary may be usable to, for example, sight, locate, or position a view of the input device of user device 120 within a field of view defined by a display of viewing device 110, such as with respect to virtual objects including overlay input devices or keyboards, substitute input devices or keyboards, and the like. For example, the positioning marker or boundary may be usable to physically orient and position the field of view defined by the display of viewing device 110 to facilitate relative positioning of the view of the input device of user device 120 with respect to the overlay input device or keyboard. In the various embodiments, the positioning marker may be usable to superpose the overlay keyboard on the view of the input device of user device 120.

User device 120 hosts secure password input program 130. In various embodiments of the present invention, user device 120 may be a smart phone, a tablet computer, a laptop computer, or a desktop computer. In the various embodiments, user device 120 may implement a combination of devices and technologies, such as network devices and corresponding device drivers, to support the operation of secure password input program 130, and to provide a platform enabling communications between user device 120 and viewing device 110.

In an embodiment of the present invention, the input device of user device 120 may be a keyboard, a keypad, or the like, or may otherwise be a touch screen capable of implementing a virtual or simulated keyboard, keypad, or the like. In the embodiment, the input device may include a layout of input elements, such as in the form of keys with respect to a keyboard or keypad, or sensing areas with respect to a touch screen, that may each respectively represent a corresponding character. A character may be an alphanumeric character, a logogram, a grapheme, a syllabary, a glyph, a symbol, a mark, or the like. In the embodiment, the input device may be used by a user for password input to user device 120. A password may be formed or composed of a string or sequence of password elements, such as in the form of characters.

Secure password input program 130 includes data transceiver module 132, secure password input module 134, and data storage 138. Secure password input program 130 may be a program such as a software program, one or more subroutines contained in a program, an application programming interface, or the like. Secure password input program 130 communicates with the input device of user device 120 and data communication module 112 residing on viewing device 110.

Data transceiver module 132 communicates with the input device of user device 120, and communicates generated virtual object data to data communication module 112 by way of network 102. In an embodiment of the present invention, the retrieved data from the input device may include, for example, input element layout data. In the embodiment, the input element layout data may be based on a layout of input elements of the input device used for password input to user device 120. In the embodiment, the input element layout data may include, for example, data relating to individual and relative positions of each of the input elements in the layout. In the embodiment, the input element layout data may further include, for example, data relating to an overall shape and size of the layout. Data transceiver module 132 stores the retrieved data in data storage 138 for later retrieval and use by secure password input program 130.

Secure password input module 134 generates the virtual object data. In an embodiment of the present invention, the virtual object data may include, for example, computer graphics data such as raster graphics data, bitmap image data, vector graphics data, or the like. The graphics data may include, for example, digital image or digital visualization rendering instructions. Generally, the particular data types generated may be chosen as a matter of design, such as with respect to display characteristics, capabilities, or limitations of viewing device 110.

Figure 2:
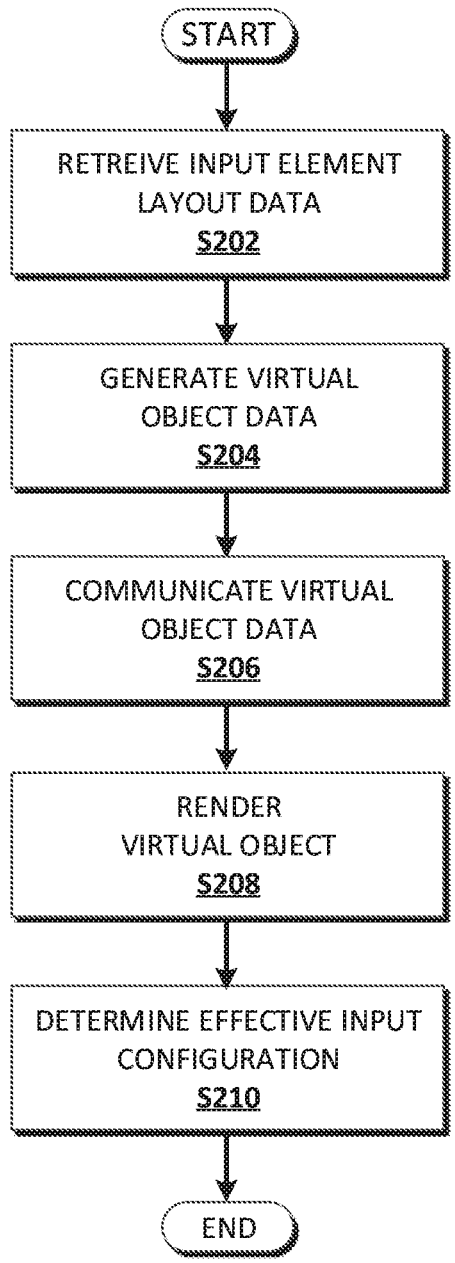
FIG. 2 is a flowchart depicting operational steps of an aspect of the secure password input system, in accordance with an embodiment of the present invention.

FIG. 2 is a flowchart depicting operational steps of an aspect of secure password input system 100, in accordance with an embodiment of the present invention.

At step S202, data transceiver module 132 retrieves the input element layout data. In an embodiment of the present invention, the input element layout data may be retrieved in response to, for example, an authentication or password input request received by user device 120, such as from a web service provider, or the like. The authentication request may require entry of a password in order for access to the secured resource to be granted. In the embodiment, the password input may be entered by way of the input device of user device 120.

At step S204, secure password input module 134 generates the virtual object data. The virtual object data may be generated by implementing, for example, a digital image rendering algorithm such as a rasterization algorithm. In an embodiment of the present invention, the virtual object data may be generated based on the input element layout data to enable rendering of virtual objects such as the overlay keyboard, the positioning marker, and the substitute keyboard. In the embodiment, altered input element layout data may be generated for use in determining and generating an effective input configuration or layout of the layout of input elements of the input device to correspond to the altered layout of input elements, accordingly.

At step S206, data transceiver module 132 communicates the generated virtual object data. In an embodiment of the present invention, the virtual object data may be communicated to data communication module 112 by way of network 102. In the embodiment, the virtual object data may additionally or alternatively be communicated to data communication module 112 by way of electromagnetic waves, such as transmitted within a radio frequency range. For example, the virtual object data may be communicated to an optical head-mounted display by way of network 102. The virtual object data may otherwise be communicated to a contact lens display or an intra-ocular display using, for example, radio frequency communication. In the embodiment, the virtual object data may additionally or alternatively be communicated to the input device of user device 120.

At step S208, viewing module 114 renders the virtual objects for display by viewing device 110 based on the digital image rendering instructions of the virtual object data. In an embodiment of the present invention, renderings of the virtual objects, such as in the form of overlay input devices or keyboards, positioning markers, and the like, may be displayed within the field of view defined by the display of viewing device 110. In the embodiment, the virtual objects may be displayed for viewing in superposition with respect to the input device of user device 120, for entry of the password input to user device 120 by way of the input device. In the embodiment, the password input may be entered in accordance with the altered layout of input elements of the overlay keyboard.

At step 210, an effective input configuration of the layout of input elements of the input device is determined and generated. In an embodiment of the present invention, the effective input configuration may be determined and generated to correspond to the altered layout of input elements of the overlay keyboard for entry of the password input. In the embodiment, the password input may be entered, for example, in accordance with the altered layout of input elements.

Figure 3A:
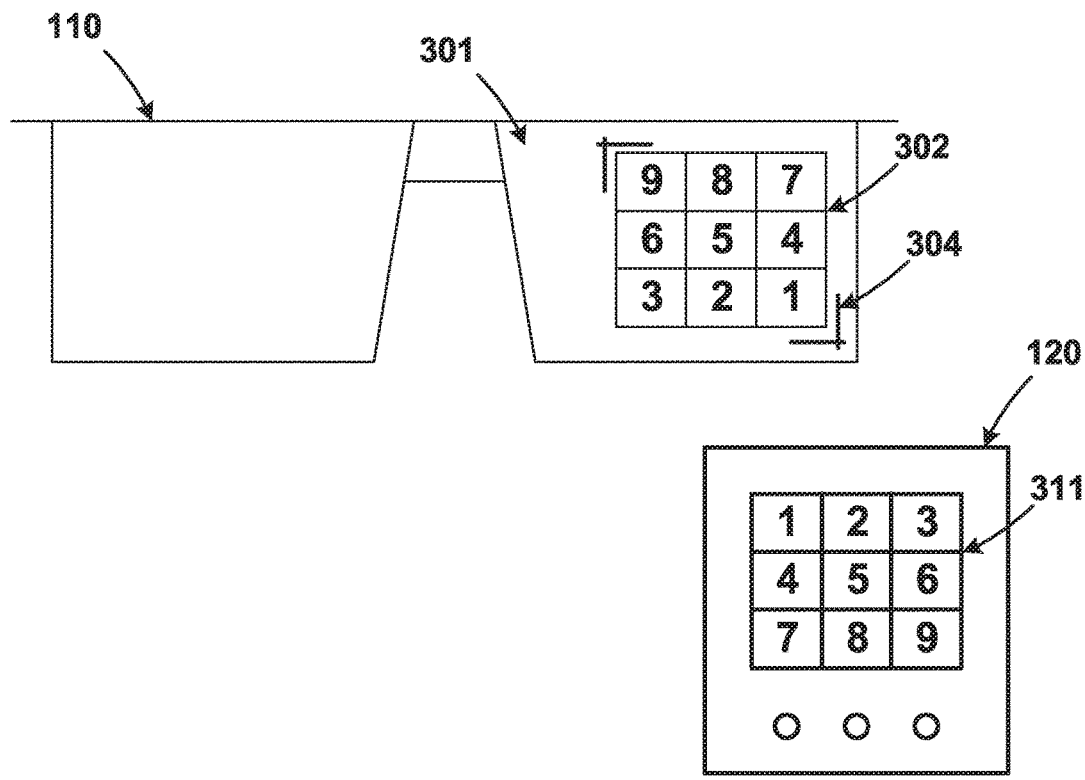
FIGS. 3A and 3B depict a viewing device and a user device during intermediate steps of a method of secure password input, in accordance with an embodiment of the present invention.
Figure 3B:
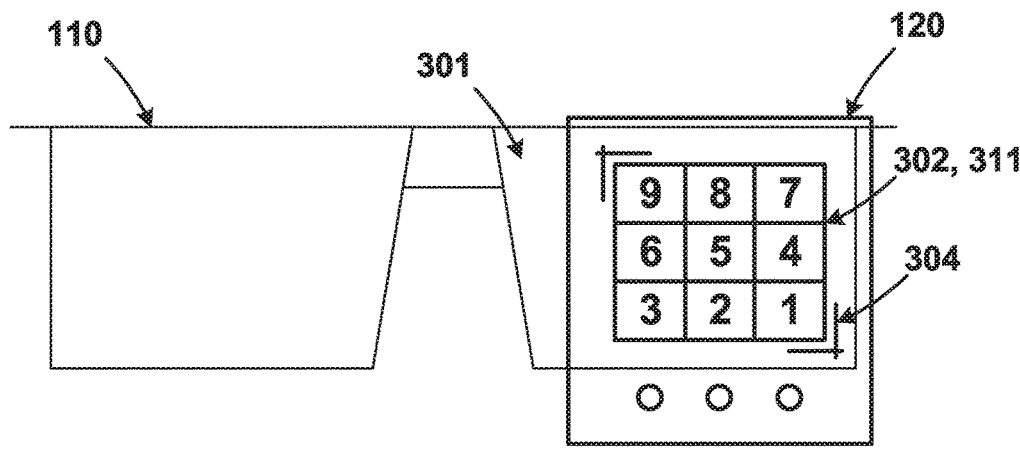

FIGS. 3A and 3B depict viewing device 110 and user device 120 during intermediate steps of a method of secure password input, in accordance with an embodiment of the present invention. As depicted in FIG. 3A, the steps may include displaying virtual objects such as overlay input device 302 or positioning marker 304 by display 301 of viewing device 110. As depicted in FIG. 3B, the steps may further include updating effective input layout 311 of the input elements of the input device of user device 120 to correspond to the altered layout of input elements of the overlay input device 302 for entry of the password input. In an embodiment of the present invention, the input device of user device 120 may be, for example, a touch screen capable of implementing a virtual or simulated keyboard, keypad, or the like. In the embodiment, the input device of user device 120 may otherwise be, for example, a keypad, or the like.

With reference to FIG. 3A, virtual objects such as overlay input device 302 including the altered layout of input elements is displayed by display 301 of viewing device 110. In an embodiment of the present invention, the altered layout of input elements may be generated, for example, based on the input element layout data retrieved from user device 120. For example, where the layout of input elements of the input device of user device 120 corresponds to a telephone keypad layout of input elements in which the numbers 1 through 9 are arranged sequentially in three rows and columns from left to right and from top to bottom, the altered layout of input elements may be generated to include the numbers 1 through 9 arranged in three rows and three columns from right to left and from bottom to top, as depicted in FIG. 3A. In the embodiment, individual and relative positions of each of the input elements in the altered layout of overlay input device 302 may be randomized with respect to the individual and relative positions of each of the input elements in effective input layout 311 of the input device of user device 120. A manner and extent of the randomization may be chosen as a matter of design. In the embodiment, where the input device of user device 120 includes a touch screen, or the like, the substitute input device or keyboard, as previously described, may be visualized and displayed in place of the input device of user device 120 in terms of the false layout or configuration of visualized input elements.

With reference to FIG. 3B, effective input layout 311 of the input elements of the input device of user device 120 is determined and updated to correspond to the altered layout of input elements of the overlay input device 302 for entry of the password input. In an embodiment of the present invention, individual and relative positions of each of the input elements in effective input layout 311 are updated to correspond the individual and relative positions of each of the input elements in the altered layout of overlay input device 302 for entry of the password input. For example, positions of each of the input elements in effective input layout 311 may be updated to match positions of each of the input elements in the altered layout of overlay input device 302, as depicted in FIG. 3B. In the embodiment, viewing overlay input device 302 in superposition with respect to the input device of user device 120 enables entry of the password input in accordance with overlay input device 302. In the embodiment, positioning marker 304 may, for example, define a boundary within which to position a view of the input device of user device 120, for viewing of overlay input device 302 in superposition with respect to the input device of user device 120.

Figure 4:
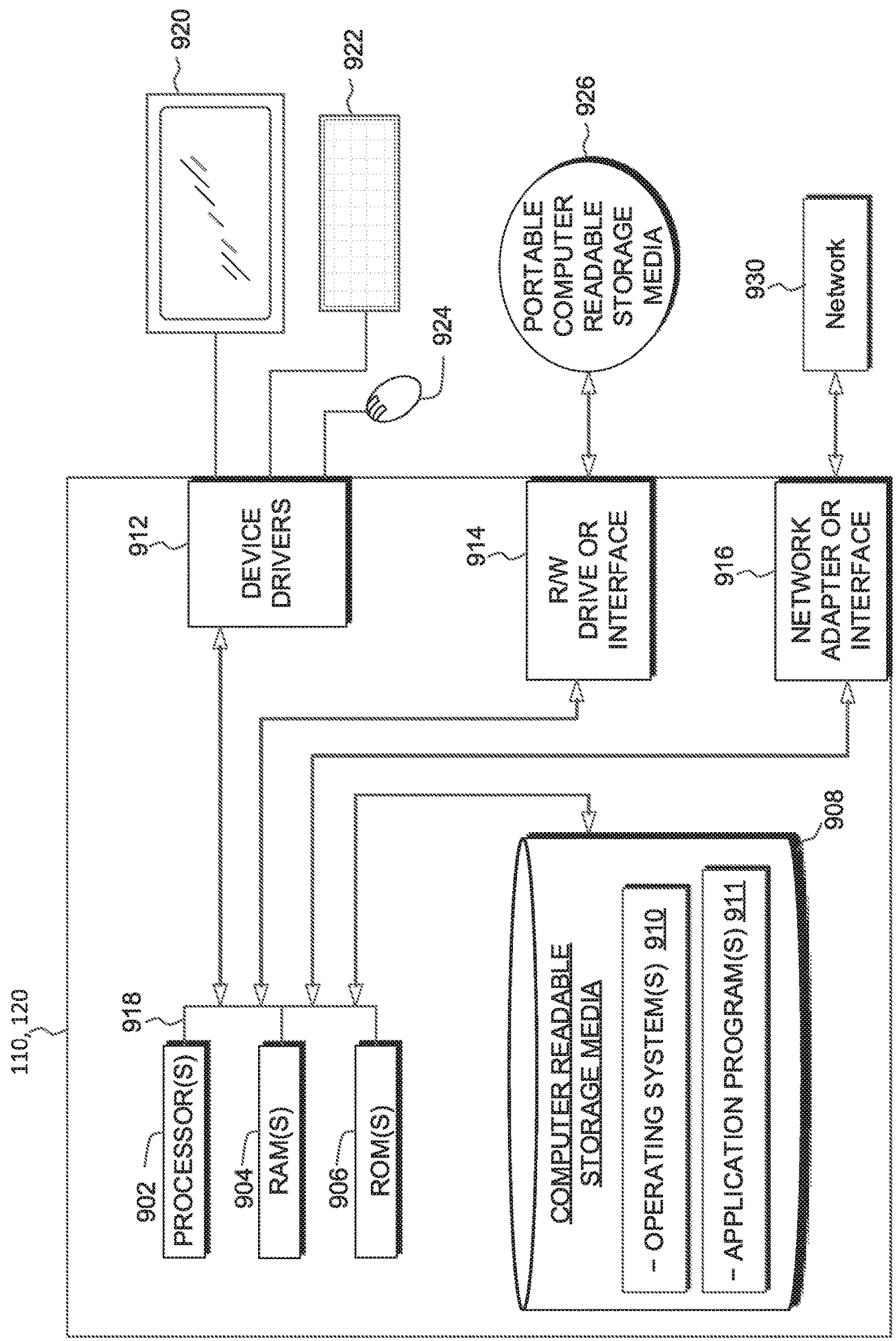
FIG. 4 is a block diagram depicting a viewing device and/or a user device, in accordance with an embodiment of the present invention.

FIG. 4 is a block diagram depicting viewing device 110 and/or user device 120, in accordance with an embodiment of the present invention.

As depicted in FIG. 4, viewing device 110 and/or user device 120 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. The network adapter 916 communicates with a network 930. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, such as secure password input program 130 residing on user device 120, as depicted in FIG. 1, are stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Viewing device 110 and/or user device 120 may also include a R/W drive or interface 914 to read from and write to one or more portable computer readable storage media 926. Application programs 911 on viewing device 110 and/or user device 120 may be stored on one or more of the portable computer readable storage media 926, read via the respective R/W drive or interface 914 and loaded into the respective computer readable storage media 908. Viewing device 110 and/or user device 120 may also include a network adapter or interface 916, such as a Transmission Control Protocol (TCP)/Internet Protocol (IP) adapter card or wireless communication adapter (such as a 4G wireless communication adapter using Orthogonal Frequency Division Multiple Access (OFDMA) technology). Application programs 911 on the server 220 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers. Viewing device 110 and/or user device 120 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may include hardware and software (stored on computer readable storage media 908 and/or ROM 906).

User device 120 can be a standalone network server, or represent functionality integrated into one or more network systems. In general, viewing device 110 and/or user device 120 can be a laptop computer, desktop computer, specialized computer server, or any other computer system known in the art. In certain embodiments, user device 120 represents computer systems utilizing clustered computers and components to act as a single pool of seamless resources when accessed through a network, such as a LAN, WAN, or a combination of the two. This implementation may be preferred for data centers and for cloud computing applications. In general, viewing device 110 and/or user device 120 can be any programmable electronic device, or can be any combination of such devices.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
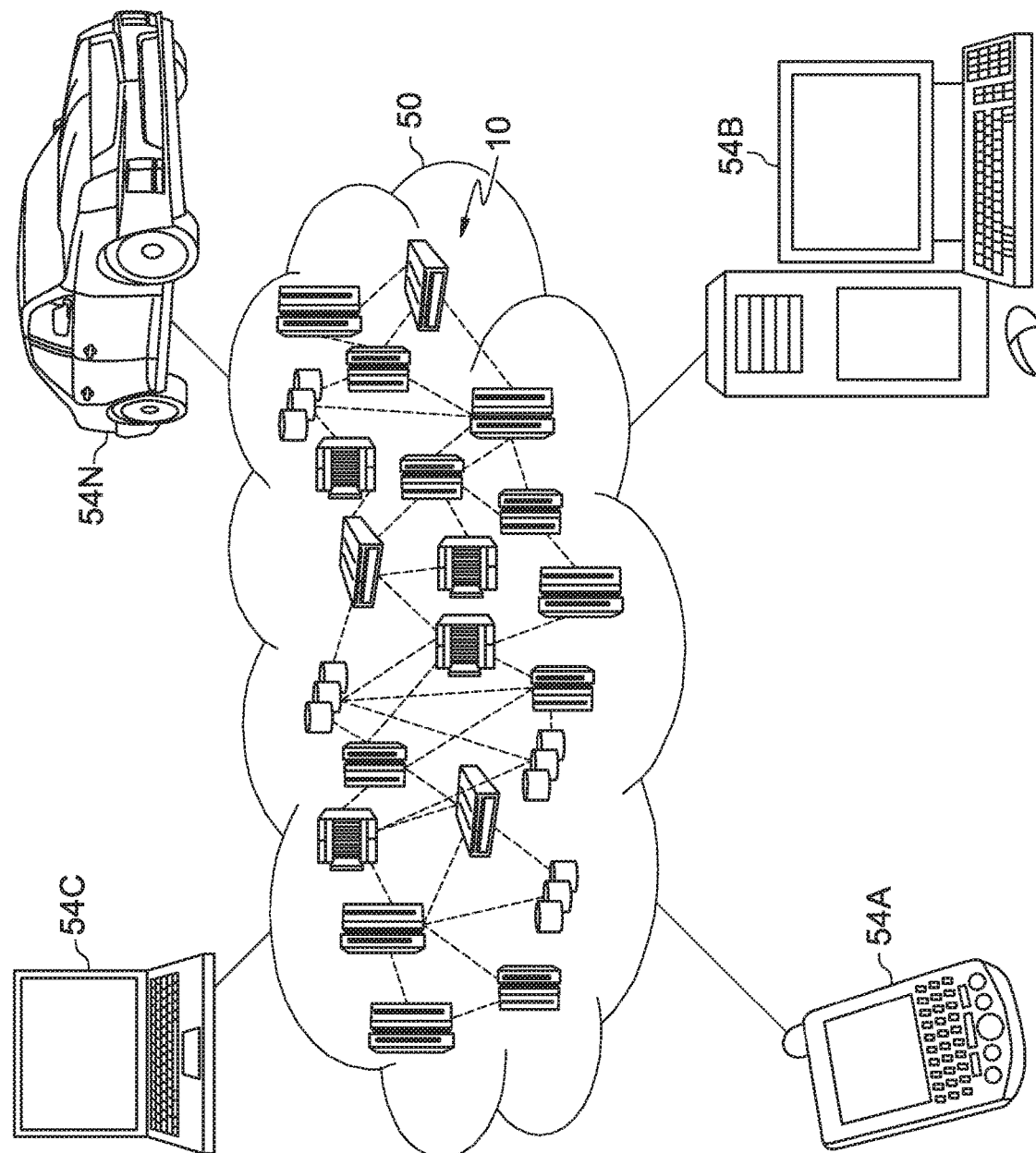
FIG. 5 depicts a cloud computing environment, in accordance with an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
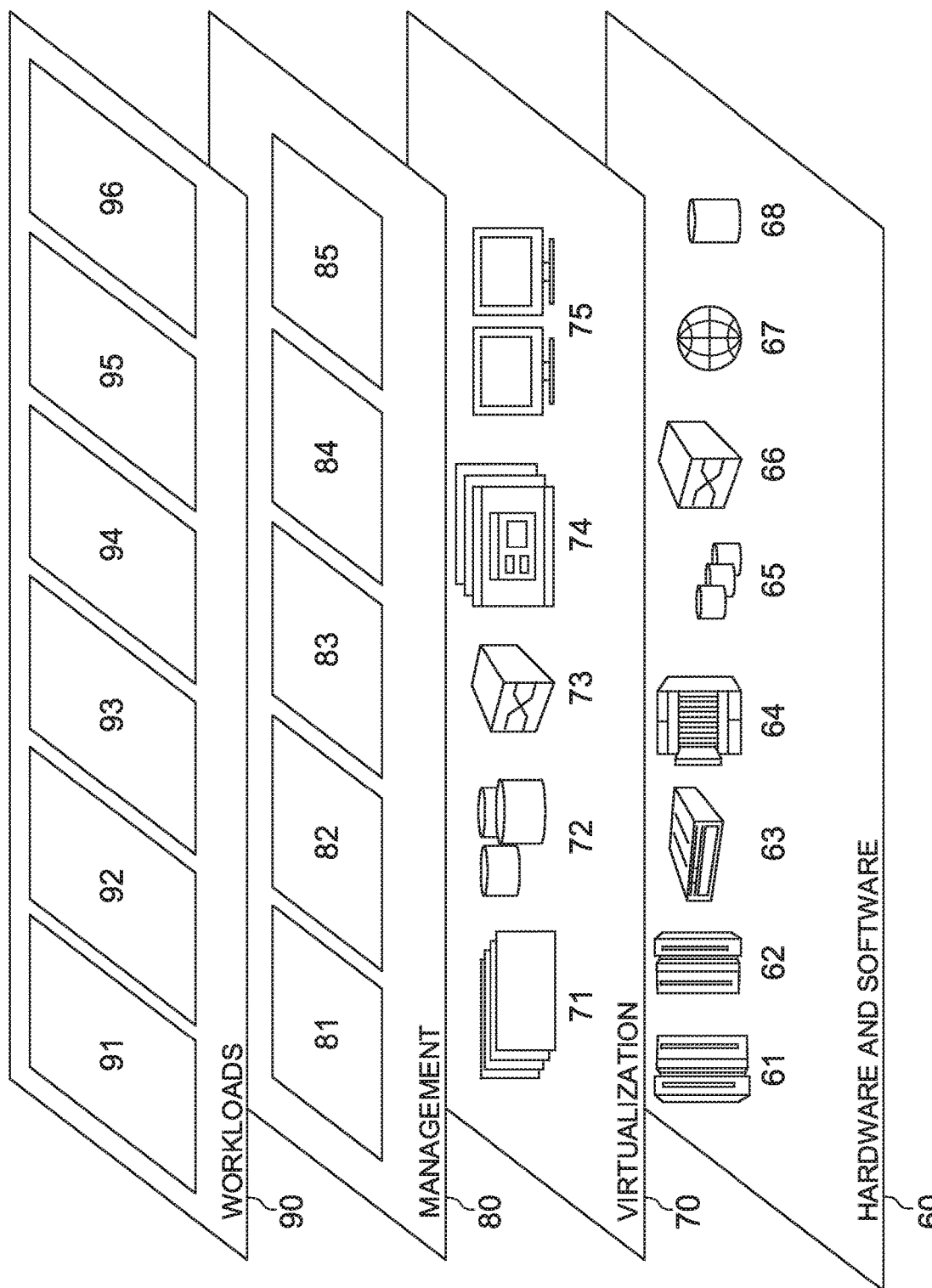
FIG. 6 depicts abstraction model layers, in accordance with an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and solar power forecasting 96. Secure password input 96 may include functionality enabling the cloud computing environment to be used for secure password input, in accordance with embodiments of the present invention.

While the invention has been shown and described with reference to certain exemplary embodiments thereof, it will be understood by those skilled in the art that various changes in form and details may be made therein without departing from the spirit and scope of the present invention as defined by the appended claims and their equivalents. Therefore, the present invention has been disclosed by way of example for purposes of illustration, and not limitation.

What is claimed is:

1. A computer-implemented method, comprising:
retrieving input element layout data based on a layout of input elements of an input device in response to receiving a password input request;
generating a positioning marker and a visualized overlay input device, the positioning marker comprising a member selected from the group consisting of a reticle, a graticule, and a crosshair, and the visualized overlay input device comprising an altered layout of input elements based on the input element layout data;
rendering the visualized overlay input device and the positioning marker for display by a see-through display device for viewing of the visualized overlay input device in superposition with respect to the input device, wherein the see-through display device is selected from the group consisting of a contact lens display and an intra-ocular display, and wherein data for the positioning marker and for the visualized overlay input device are communicated from the input device to the see-through display device via radio frequency communication;
sighting the input device with respect to the visualized overlay input device by way of the positioning marker such that the visualized overlay input device is superposed on a view of the input device; and
generating an effective input configuration of the layout of input elements of the input device to correspond to the altered layout of input elements for entry of a password input.

2. The computer-implemented method of claim 1, further comprising:
generating a visualized substitute input device comprising a substitute layout of input elements based on the input element layout data; and
rendering the visualized substitute input device for display by the input device in place of the input device for entry of the password input.

3. The computer-implemented method of claim 2, wherein the substitute layout of input elements comprises a discrepancy with respect to an original layout of input elements of the input device.

4. The computer-implemented method of claim 1, wherein the entry of the password input comprises entry of the password input in accordance with the altered layout of input elements.

5. A computer system comprising:
one or more computer processors, one or more computer-readable storage media, and program instructions stored on one or more of the computer-readable storage media for execution by at least one of the one or more computer processors, the program instructions, when executed by the at least one of the one or more computer processors, causing the computer system to perform a method comprising:
retrieving input element layout data based on a layout of input elements of an input device in response to receiving a password input request;

generating a positioning marker and a visualized overlay input device, the positioning marker comprising a member selected from the group consisting of a reticle, a graticule, and a crosshair, and the visualized overlay input device comprising an altered layout of input elements based on the input element layout data;

rendering the visualized overlay input device and the positioning marker for display by a see-through display device for viewing of the visualized overlay input device in superposition with respect to the input device, wherein the see-through display device is selected from the group consisting of a contact lens display and an intra-ocular display, and wherein data for the positioning marker and for the visualized overlay input device are communicated from the input device to the see-through display device via radio frequency communication;

sighting the input device with respect to the visualized overlay input device by way of the positioning marker such that the visualized overlay input device is superposed on a view of the input device; and generating an effective input configuration of the layout of input elements of the input device to correspond to the altered layout of input elements for entry of a password input.

6. The computer system of claim 5, the method further comprising:

generating a visualized substitute input device comprising a substitute layout of input elements based on the input element layout data; and rendering the visualized substitute input device for display by the input device in place of the input device for entry of the password input.

7. The computer system of claim 6, wherein the substitute layout of input elements comprises a discrepancy with respect to an original layout of input elements of the input device.

8. The computer system of claim 5, wherein the entry of the password input comprises entry of the password input in accordance with the altered layout of input elements.

9. A computer program product comprising:

one or more computer-readable storage devices and program instructions stored on at least one of the one or more computer-readable storage devices for execution by at least one or more computer processors of a computer system, the program instructions, when executed by the at least one of the one or more computer processors, causing the computer system to perform a method comprising:

retrieving input element layout data based on a layout of input elements of an input device in response to receiving a password input request;

generating a positioning marker and a visualized overlay input device, the positioning marker comprising a member selected from the group consisting of a reticle, a graticule, and a crosshair, and the visualized overlay input device comprising an altered layout of input elements based on the input element layout data;

rendering the visualized overlay input device and the positioning marker for display by a see-through display device for viewing of the visualized overlay input device in superposition with respect to the input device, wherein the see-through display device is selected from the group consisting of a contact lens display and an intra-ocular display, and wherein data for the positioning marker and for the visualized overlay input device are communicated from the input device to the see-through display device via radio frequency communication;

sighting the input device with respect to the visualized overlay input device by way of the positioning marker such that the visualized overlay input device is superposed on a view of the input device; and generating an effective input configuration of the layout of input elements of the input device to correspond to the altered layout of input elements for entry of a password input.

10. The computer program product of claim 9, the method further comprising:

generating a visualized substitute input device comprising a substitute layout of input elements based on the input element layout data; and rendering the visualized substitute input device for display by the input device in place of the input device for entry of the password input.

11. The computer program product of claim 10, wherein the substitute layout of input elements comprises a discrepancy with respect to an original layout of input elements of the input device.

12. The computer program product of claim 9, wherein the entry of the password input comprises entry of the password input in accordance with the altered layout of input elements.

* * * * *